United States Patent
Sisk

(10) Patent No.: US 9,677,672 B2
(45) Date of Patent: Jun. 13, 2017

(54) BUTTERFLY VALVE HAVING INTEGRAL GASKETS FOR ITS INLET AND OUTLET SEATS

(71) Applicant: David E Sisk, Bonne Terre, MO (US)

(72) Inventor: David E Sisk, Bonne Terre, MO (US)

(73) Assignee: Bulk Tank, Inc., Bonne Terre, MO (US)

( * ) Notice: Subject to any disclaimer, the term of this patent is extended or adjusted under 35 U.S.C. 154(b) by 0 days.

(21) Appl. No.: 14/756,825

(22) Filed: Oct. 19, 2015

(65) Prior Publication Data

US 2016/0123473 A1    May 5, 2016

Related U.S. Application Data

(60) Provisional application No. 62/123,035, filed on Nov. 5, 2014.

(51) Int. Cl.
  *F16K 1/22* (2006.01)
  *F16K 1/226* (2006.01)
  *F16K 27/02* (2006.01)

(52) U.S. Cl.
  CPC ............ *F16K 1/2263* (2013.01); *F16K 1/224* (2013.01); *F16K 27/0218* (2013.01)

(58) Field of Classification Search
  CPC ..... F16K 1/2263; F16K 1/224; F16K 27/0218
  USPC ................. 251/305–308, 900, 368; 285/351
  See application file for complete search history.

(56) References Cited

U.S. PATENT DOCUMENTS

| | | | | |
|---|---|---|---|---|
| 2,032,623 A * | 3/1936 | Lewis | ................... | F16K 5/0605 251/152 |
| 3,565,394 A * | 2/1971 | Smith | ................... | F16K 1/2265 251/306 |
| 3,589,675 A * | 6/1971 | Scaramucci | .......... | F16K 5/0631 251/151 |
| 3,687,163 A * | 8/1972 | Nickels | ................. | F16K 11/076 251/317 |
| 3,752,181 A * | 8/1973 | Morris | ...................... | F16K 1/22 251/308 |
| 3,771,763 A * | 11/1973 | Myers | ................... | F16K 1/2285 251/306 |
| 3,904,173 A * | 9/1975 | Naylor | .................. | F16K 1/2265 137/375 |
| 3,958,595 A * | 5/1976 | Al | .............................. | F16K 1/22 137/375 |
| 3,967,812 A * | 7/1976 | Newell | ................. | F16K 1/2268 251/214 |
| 4,015,818 A * | 4/1977 | Tawakol | ............... | F16K 1/2263 251/307 |
| 4,023,773 A * | 5/1977 | Wise | ...................... | F16K 5/0605 251/148 |
| 4,133,513 A * | 1/1979 | Meyer | ................... | F16K 1/2268 251/306 |

(Continued)

*Primary Examiner* — John Bastianelli
(74) *Attorney, Agent, or Firm* — Paul M. Denk

(57) ABSTRACT

A butterfly valve comprising a housing having an upper side having an upper valve seat member and a lower side having a lower valve seat member, an extension section having an extension shaft member that extends out of an opening formed in a flange, the extension shaft member having a shaft end that fits within a first shaft bearing formed in a movable disc member, the movable disc member having a second shaft bearing formed therein, and a shaft portion for fitting within the second shaft bearing.

3 Claims, 4 Drawing Sheets

(56) References Cited

U.S. PATENT DOCUMENTS

| | | | | |
|---|---|---|---|---|
| 4,278,275 A * | 7/1981 | Diederich, Jr. | ......... | F16L 39/00 |
| | | | | 285/12 |
| 4,331,268 A * | 5/1982 | Chisholm | ................. | F16T 1/00 |
| | | | | 137/204 |
| 4,335,688 A * | 6/1982 | Diederich, Jr. | ...... | B01D 35/147 |
| | | | | 137/269 |
| 4,938,250 A * | 7/1990 | Peterson | .............. | B65D 90/587 |
| | | | | 137/240 |
| 5,039,063 A * | 8/1991 | Louch | ................... | F16K 3/0281 |
| | | | | 251/151 |
| 5,174,547 A * | 12/1992 | Vuillermoz | ........... | F16L 55/045 |
| | | | | 251/120 |
| 5,291,969 A * | 3/1994 | Diederich, Jr. | ........ | B01D 35/18 |
| | | | | 285/12 |
| 5,979,872 A * | 11/1999 | Stearns | ............... | F16K 27/0218 |
| | | | | 137/375 |
| 6,029,948 A * | 2/2000 | Shafer | ................... | F16K 5/0673 |
| | | | | 251/171 |
| 2006/0214128 A1 * | 9/2006 | Horner | ...................... | F16K 1/22 |
| | | | | 251/305 |
| 2012/0241657 A1 * | 9/2012 | Sisk | .................... | F16K 27/0218 |
| | | | | 251/293 |

\* cited by examiner

BUTTERFLY VALVE HAVING INTEGRAL GASKETS FOR ITS INLET AND OUTLET SEATS

CROSS REFERENCE TO RELATED APPLICATION

This regular letters patent application claims priority to the provisional patent application having Ser. No. 62/123,035, filed on Nov. 5, 2014.

FIELD OF THE DISCLOSURE

This disclosure relates to a butterfly valve device that is structured to aid in accelerating the flow a liquid, such as petroleum, from a tank trailer, railroad car, or other storage device to speed up the delivery or unloading of the liquid from the vehicle, and more particularly, to a butterfly valve device having an integral seat member to facilitate installation and removal of the butterfly valve device from the tank trailer or vehicle.

BACKGROUND

Butterfly valves have been used in conjunction with tank trailers and railroad cars to allow material, such as petroleum, liquids, grains, polymer beads, sand, or other flowing material, being stored within the tank trailers or railroad cars to be discharged upon operation of the butterfly valve. The butterfly valve also prevents the untimely discharge of the material during loading and transportation of the material. As can be appreciated, the operation of the butterfly valve is required to facilitate the efficient and timely discharge of material from the tank trailer or railroad car. Being able to unload material as quickly as possible is a prime factor always being sought by transporting companies that haul material. Quick discharge of the material will lower the costs of hauling the material and results in greater profit to transporting companies.

It is known that such butterfly valves become inoperable over time due to corrosion or failure. Once the butterfly valve becomes inoperable, the valve must be removed from the tank trailer or railroad car and replaced. In order to remove the butterfly valve, a hydraulic mechanism is used to pry pipes apart to be able to slide the butterfly valve from out between the pipes. The butterfly valve also has gaskets that have to be removed along with the butterfly valve. As can be appreciated, the gaskets may also be difficult to be removed due to corrosion. Once removed, a new butterfly valve and associated gaskets will be inserted between the pipes and secured in place. If the butterfly valve is corroded in place, attempting to remove the valve may be difficult and time consuming. Being able to quickly and easily change the butterfly valve would achieve savings in both time and money. The quicker the butterfly valve is to change results in the transportation company being able to quickly get the tank trailer back on the road. Again, any savings that can be achieved results in greater profit to the transporting company.

The present disclosure is designed to obviate and overcome many of the disadvantages and shortcomings experienced with prior butterfly valves used in connection with the transportation of liquids, such as petroleum. Moreover, the present disclosure is related to a butterfly valve having an integral seat member that allows quick installation or removal of the butterfly valve.

SUMMARY OF THE DISCLOSURE

The present disclosure is directed to a butterfly valve which comprises a housing having an upper side having an upper valve seat member and a lower side having a lower valve seat member, an extension section having an extension shaft member that extends out of an opening formed in a flange, the extension shaft member having a shaft end that fits within a first shaft bearing formed in a movable disc member, the movable disc member having a second shaft bearing formed therein, and a shaft portion for fitting within the second shaft bearing.

The present disclosure is also directed to a butterfly valve that comprises a housing having a circular section having an upper side having an upper valve seat member and a lower side having a lower valve seat member, a movable disc member having a first shaft bearing formed therein and a second shaft bearing formed therein, an extension section having an extension shaft member that extends out of an opening formed in a flange, the extension shaft member having a shaft end that fits within the first shaft bearing formed in a movable disc member, and a shaft portion for fitting within the second shaft bearing.

The present disclosure is further directed to a butterfly valve which comprises a housing having a circular section having an upper side having an upper valve seat member molded therein and a lower side having a lower valve seat member molded therein, a movable disc member having a first shaft bearing formed therein and a second shaft bearing formed therein, an extension section having an extension shaft member that extends out of an opening formed in a flange, the extension shaft member having a shaft end that fits within the first shaft bearing formed in a movable disc member, and a shaft portion for fitting within the second shaft bearing.

It should be recognized that the present disclosure provides a butterfly valve having an integral seat member for quick and easy installation or removal from a petroleum discharge of a tank trailer.

The present disclosure is also directed to a butterfly valve having an integral seat member that presents no obstruction to the free flow of liquid or petroleum material there through.

The present disclosure provides a butterfly valve having an integral seat member that resists corrosion due to being in contact with corrosive material such as petroleum.

The present disclosure also provides a butterfly valve having an integral seat member having multiple O-rings which eliminates the need for gaskets or piping configuration changes.

The present disclosure is further directed to a butterfly valve having an integral seat member that is constructed of a composite fiber body that is impervious to corrosion, petroleum products, and petroleum byproducts.

The present disclosure also provides a butterfly valve having an integral seat member that is corrosion resistance, has high strength, and has reduced weight.

The present disclosure is directed to a butterfly valve having an integral seat member that has incorporated therein a handle and a throttling plate for easy operation.

The present disclosure is also directed to a butterfly valve having an integral seat member that can be constructed of various materials that resists corrosion due to being in contact with a corrosive material such as petroleum.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
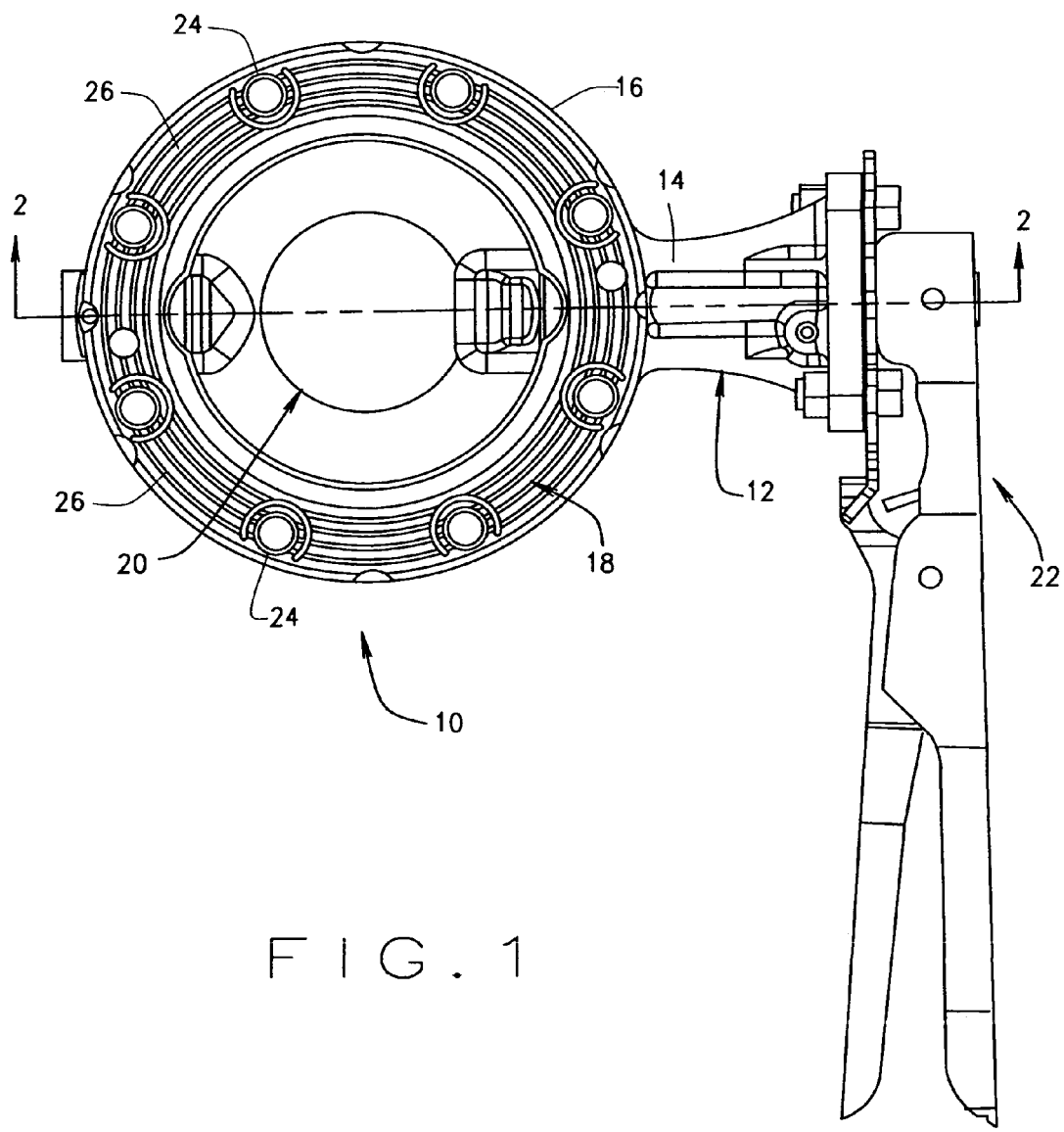
FIG. 1 is a top view of the butterfly valve having an integral seat member constructed according to the present disclosure.

Referring now to the drawings, wherein like numbers refer to like items, number 10 identifies a preferred embodiment of a butterfly valve having an integral seat member constructed according to the present disclosure. With reference now to FIG. 1, the butterfly valve 10 comprises a housing 12 having an upper side 14 having an upper valve seat 16 having an upper seat member 18, and a movable disc member 20. A valve handle 22 is shown being positioned adjacent to the housing 12. The valve handle 22 is used to operate the butterfly valve 10 to open or close the movable disc member 20, as will be explained in detail further herein. The movable disc member 20 may be an un-coated aluminum disc that allows a fluid, such as petroleum, to easily flow past the movable disc member 20 when in the open position. The upper valve seat 16 may include bolt openings 24 for receiving bolts (not shown). The upper gasket member 18 may comprise concentric O-rings 26.

Figure 2:
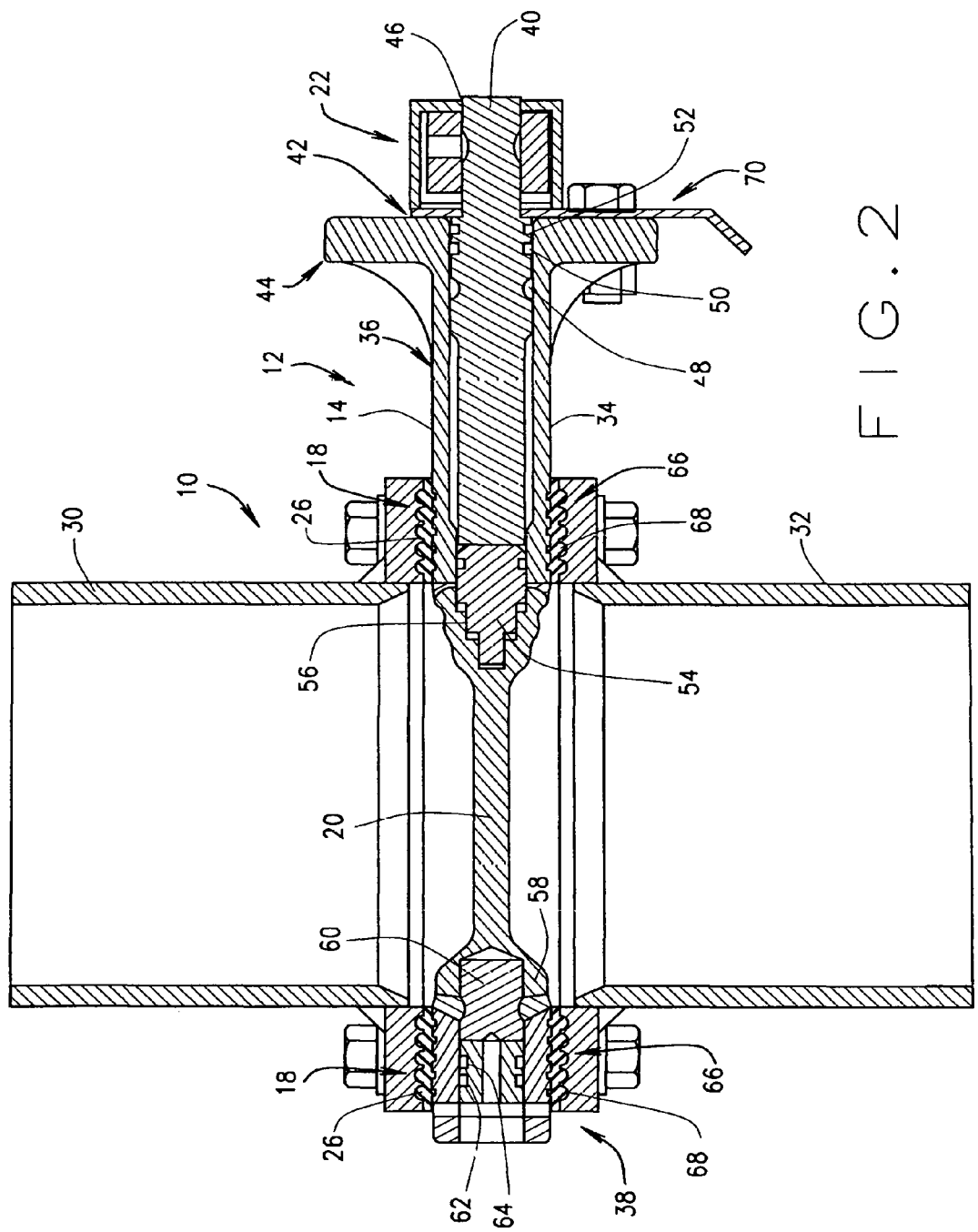
FIG. 2 is a cross-sectional view of the butterfly valve having an integral seat member shown in FIG. 1 taken along the plane of line 2-2.

FIG. 2 illustrates a cross-sectional view of the butterfly valve 10 shown in FIG. 1 taken along the plane of line 2-2. The butterfly valve 10 is shown being installed between an upper or inlet pipe or conduit 30 and a lower or outlet pipe or conduit 32. The housing 12 has the upper side 14 and a lower side 34. The housing 12 has an extension section 36 and a circular section 38. The extension section 36 has an extension shaft member 40 that extends out of an opening 42 formed in a flange or back plate 44 of the extension section 36. The extension shaft member 40 is adapted to fit within an opening 46 formed in the valve handle 22. This allows the valve handle 22 to be able to exert force to operate the butterfly valve 10. The extension section 36 has an O-ring or gasket 48 incorporated therein around the extension shaft member 40. The back plate 44 also has a pair of O-rings 50 and 52 around the extension shaft member 40. The O-rings 50 and 52 prevent any debris, liquid, or other matter from entering into the opening 42 in the housing 12.

The extension shaft member 40 has a shaft end 54 that fits within a shaft bearing or bushing 56 formed as part of the movable disc member 20. The movable disc member 20 also has another shaft bearing or bushing 58 formed therein. The shaft bearing 58 receives a shaft portion 60. A pair of O-rings 62 and 64 are positioned over the shaft portion 60 to facilitate movement or rotation of the shaft portion 60. As can be appreciated, rotation of the extension shaft member 40 will rotate the shaft end 54 within the shaft bearing 56 and the shaft portion 60 within the shaft bearing 58. In this manner the movable disc member 20 can be opened or closed. The upper gasket member 18 is shown comprising the concentric O-rings 26. The butterfly valve 10 also comprises a lower seat member 66 having concentric O-rings 68. The seat members 18 and 66 are elastomer boot type valve seats that incorporate flange gaskets or concentric O-rings 26 and 68, respectively. The flange 44 is used for mounting thereon a valve indexing throttle plate 70. The plate 70 may used in conjunction With'the valve handle 22 to assist in operating the butterfly valve 10. The housing 12 may consists of a composite fiber. The composite fiber is impervious to corrosion, petroleum products, and petroleum byproducts. Further, the seat members 18 and 66 are molded in place and consists of a material such as a special blend Buna-n or Viton®.

Figure 3:
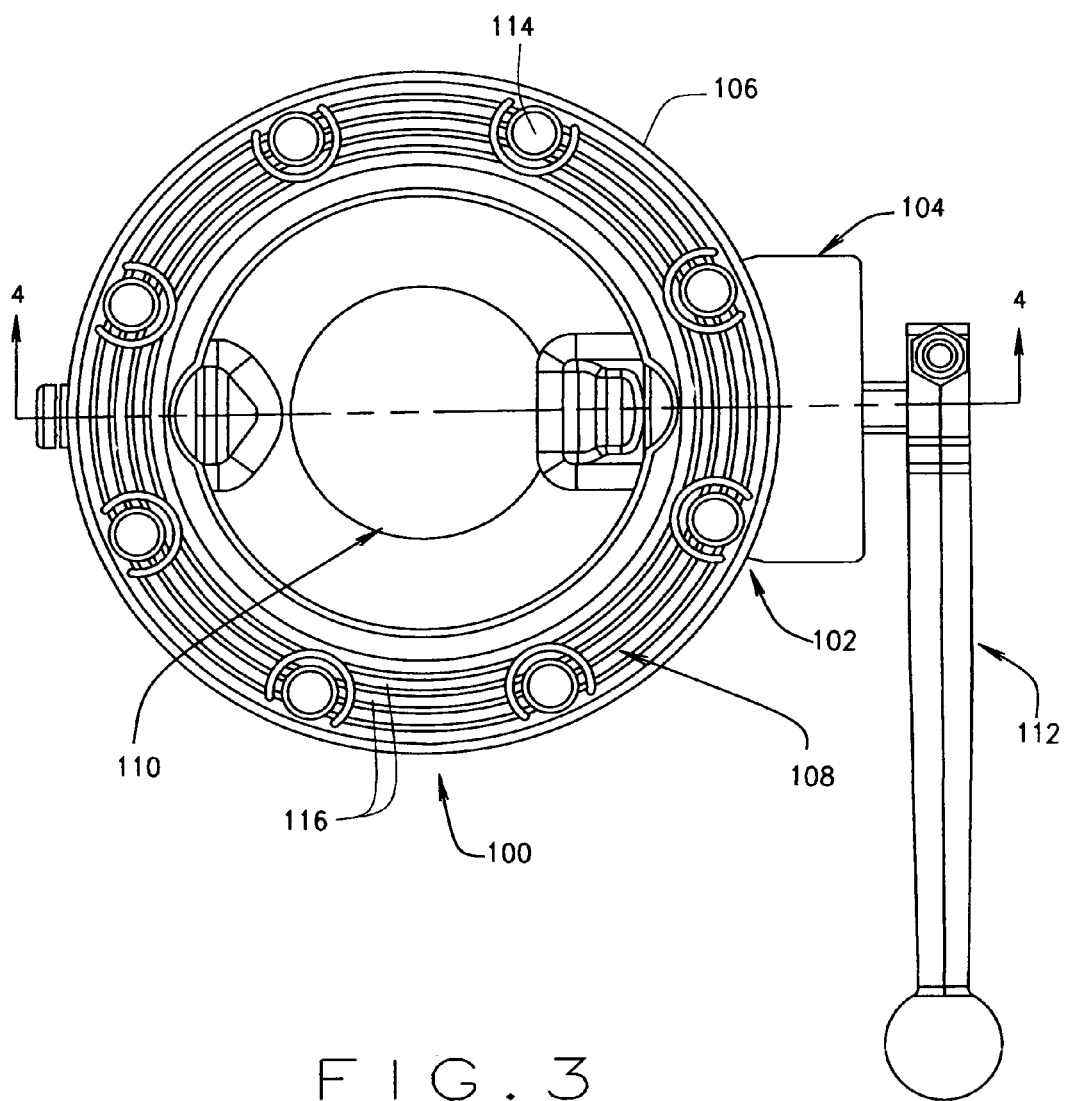
FIG. 3 is is a top view of another embodiment of a butterfly valve having an integral seat member constructed according to the present disclosure.

With reference now to FIG. 3, another embodiment of a butterfly valve 100 constructed according to the present disclosure is shown. The butterfly valve 100 comprises a housing 102 having an upper side 104 having an upper valve seat 106 having an upper seat member 108, and a movable disc member 110. A valve handle 112 is shown being positioned adjacent to the housing 102. The valve handle 112 is used to operate the butterfly valve 100 to open or close the movable disc member 110. The movable disc member 110 may be an un-coated aluminum disc that allows a fluid, such as petroleum, to easily flow past the movable disc member 110 when in the open position. The upper valve seat 106 may include bolt openings 114 for receiving bolts (not shown). The upper gasket member 108 may comprise concentric O-rings 116.

Figure 4:
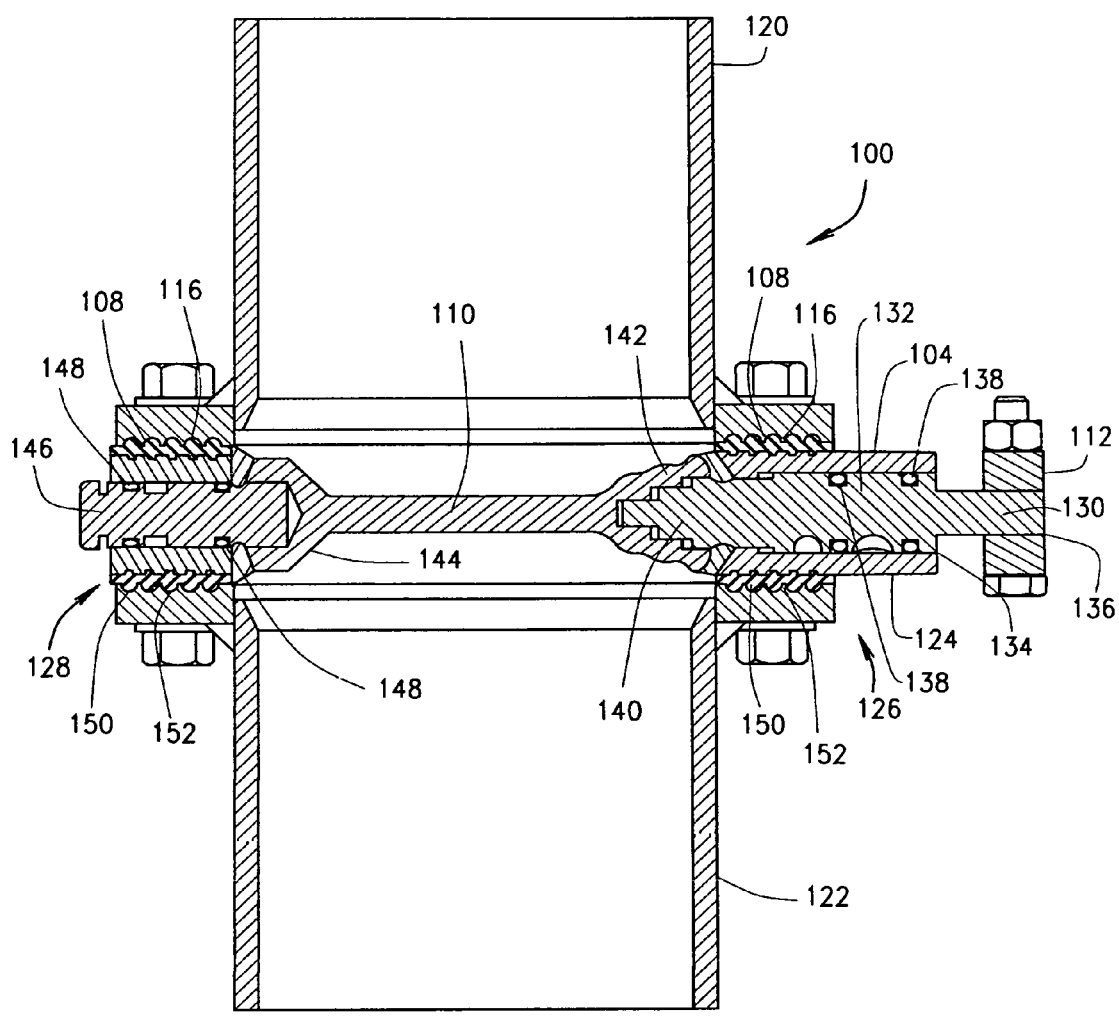
FIG. 4 is a cross-sectional view of the butterfly valve having an integral seat member shown in FIG. 3 taken along the plane of line 4-4.

FIG. 4 illustrates a cross-sectional view of the butterfly valve 100 shown in FIG. 3 taken along the plane of line 4-4. The butterfly valve 100 is shown being installed between an upper or inlet pipe or conduit 120 and a lower or outlet pipe or conduit 122. The housing 102 has the upper side 104 and a lower side 124. The housing 102 has an extension section 126 and a circular section 128. The extension section 126 has an extension end 130 of an extension shaft member 132 that extends out of an opening 134 formed in the extension section 126. The extension end 130 is adapted to fit within an opening 136 formed in the valve handle 112. This allows the valve handle 112 to be able to exert force to operate the butterfly valve 100. The extension section 126 has various O-rings or gaskets 138 incorporated therein around the extension shaft member 132. The O-rings 138 prevent any debris, liquid, or other matter from entering into the opening 134 in the housing 102.

The extension shaft member 132 has a shaft end 140 that fits within a first shaft bearing or bushing 142 formed as part of the movable disc member 110. The movable disc member 110 also has a second shaft bearing or bushing 144 formed therein. The shaft bearing 144 receives a shaft portion 146. Various O-rings 148 are positioned over the shaft portion 146 to facilitate movement or rotation of the shaft portion 146. As can be appreciated, rotation of the extension shaft member 132 will rotate the shaft end 140 within the shaft bearing 142 and the shaft portion 146 within the shaft bearing 144. In this manner the movable disc member 110 can be opened or closed. The upper gasket member 108 is shown comprising the concentric O-rings 116. The butterfly valve 100 also comprises a lower seat member 150 having concentric O-rings 152. The seat members 108 and 150 are elastomer boot type valve seats that incorporate flange gaskets or the concentric O-rings 116 and 152, respectively. The housing 102 may consists of a composite fiber. The composite fiber is impervious to corrosion, petroleum products, and petroleum byproducts. Further, the seat members 108 and 150 are molded in place and consists of a material such as a special blend Buna-n or Viton®.

The butterfly valves 10 and 100 may be used in connection with the underside of a bin of a tank trailer, railroad car, hopper, or bulk storage container that is used to haul or transport a liquid such as petroleum. The butterfly valves 10 and 100 are initially in a closed position to prevent any liquid to flow through the valves 10 and 100. As can be appreciated, when the valves 10 and 100 are in the closed position, liquid will be adjacent to each of the movable disc members 20 and 110. Due to the valve seat members 18 and 108 that are used in the valves 10 and 100, respectively, corrosion is prevented. Any liquid stored can be released from the bulk container by opening the valves 10 and 100 to allow the liquid to pass through the valves 10 and 100. In the event that the valves 10 and 100 have to be removed from the bulk container, the valves 10 and 100 may be easily removed by unbolting the valves 10 and 100 and removing the valves 10 and 100 from the various inlet and outlet piping.

From all that has been said, it will be clear that there has thus been shown and described herein a butterfly valve having an integral seat member. It will become apparent to those skilled in the art, however, that many changes, modifications, variations, and other uses and applications of the subject butterfly valve having an integral seat member are possible and contemplated. All changes, modifications, variations, and other uses and applications which do not depart from the spirit and scope of the disclosure are deemed to be covered by the disclosure, which is limited only by the claims which follow.

What is claimed is:

1. A butterfly valve comprising:
   a housing having a circular section having an upper side for connecting with an inlet pipe, said upper side having an upper valve seat member molded in place thereon, and said circular section of the housing having a lower side for connecting with an outlet pipe, said lower side having a lower valve seat member molded in place thereon, and said housing having an extension section on one side, and said extension section formed having an outer integral flange;

a movable disc member having a first shaft bearing formed within said housing, and a second shaft bearing formed within said housing;

said extension section having an extension shaft member that extends out of an opening formed in said flange, said extension shaft member having a shaft end that fits within the first shaft bearing formed in said movable disc member;

a shaft portion for fitting within the second shaft bearing, and holding the proximate movable disc member for pivoting within said housing;

said upper valve seat member comprises a series of concentric O-rings molded in place upon said upper valve seat member, and said concentric O-rings extending around the circumference of said upper valve seat member;

wherein said lower valve seat member comprises a series of concentric O-rings molded in place upon said lower valve seat member, and said concentric O-rings extending around the circumference of said lower valve seat member; and a series of bolts passing through at least one of the O-rings.

2. The butterfly valve of claim 1 wherein the lower valve seat member comprises a blend Buna-n.

3. The butterfly valve of claim 1 wherein the upper valve seat member comprises a blend Buna-n.

* * * * *